US010430056B2

(12) United States Patent
Poplawski et al.

(10) Patent No.: US 10,430,056 B2
(45) Date of Patent: Oct. 1, 2019

(54) QUICK EDIT SYSTEM FOR PROGRAMMING A THERMOSTAT

(71) Applicant: BRAEBURN SYSTEMS LLC, Montgomery, IL (US)

(72) Inventors: Daniel S Poplawski, Oswego, IL (US); Glenn A. Moore, Geneva, IL (US)

(73) Assignee: Braeburn Systems LLC, Montgomery, IL (US)

(*) Notice: Subject to any disclaimer, the term of this patent is extended or adjusted under 35 U.S.C. 154(b) by 404 days.

(21) Appl. No.: 14/928,254

(22) Filed: Oct. 30, 2015

(65) Prior Publication Data
US 2016/0124628 A1 May 5, 2016

Related U.S. Application Data

(60) Provisional application No. 62/072,812, filed on Oct. 30, 2014.

(51) Int. Cl.
G06F 3/048 (2013.01)
G06F 3/0484 (2013.01)
(Continued)

(52) U.S. Cl.
CPC ......... *G06F 3/04847* (2013.01); *F24F 11/30* (2018.01); *G05D 23/1904* (2013.01);
(Continued)

(58) Field of Classification Search
None
See application file for complete search history.

(56) References Cited

U.S. PATENT DOCUMENTS 2,054,039 A 9/1936 Persons
2,060,636 A 11/1936 Persons
(Continued)

FOREIGN PATENT DOCUMENTS

GB 2441221 2/2006
JP 58065977 4/1983
(Continued)

OTHER PUBLICATIONS

Secant Home Automation Inc., Cardio IIe Installer's Guide; System Version 2.5xx, 5th edition 2008 All rights reserved.
(Continued)

*Primary Examiner* — Scott T Baderman
*Assistant Examiner* — Haimei Jiang
(74) *Attorney, Agent, or Firm* — The Law Offices of Konrad Sherinian

(57) ABSTRACT

The invention includes a control for adjusting a thermostat comprising a controller including a microprocessor and memory for storing a user interface, a display screen including a touch sensitive screen, the display screen coupled to the microprocessor and memory; the user interface including a main screen having a temperature icon, a time icon, an adjustment icon, and temperature and time set points for at least two days of the week and the microprocessor programmed to highlight one of the time or temperature icons upon selection of said one of the time or temperature icons and thereafter, without navigating away from the main screen, upon selection of the adjustment touch pad icon, the microprocessor programmed to adjust the time or temperature set point.

15 Claims, 12 Drawing Sheets

(51) Int. Cl.
*G06F 3/0481* (2013.01)
*G06F 3/0488* (2013.01)
*G06F 17/24* (2006.01)
*G05D 23/19* (2006.01)
*F24F 11/30* (2018.01)
*F24F 11/52* (2018.01)

(52) U.S. Cl.
CPC ....... *G05D 23/1905* (2013.01); *G06F 3/0488* (2013.01); *G06F 3/04817* (2013.01); *G06F 3/04842* (2013.01); *G06F 17/245* (2013.01); *F24F 11/52* (2018.01)

(56) References Cited

U.S. PATENT DOCUMENTS

| | | |
|---|---|---|
| 2,253,418 A | 8/1941 | Sanders |
| 2,703,228 A | 3/1955 | Fleisher |
| 3,309,021 A | 3/1967 | Powers |
| 3,385,574 A | 5/1968 | Lohman |
| 3,481,588 A | 12/1969 | Lobb |
| 3,705,479 A | 12/1972 | Mcpherson |
| 3,724,824 A | 4/1973 | Mitich |
| 3,733,062 A | 5/1973 | Bracich |
| 3,774,588 A | 11/1973 | Yeagle |
| 3,799,517 A | 3/1974 | Tamm |
| 3,823,922 A | 7/1974 | McElreath |
| 4,036,597 A | 7/1977 | Filss |
| 4,056,582 A | 11/1977 | Chow |
| 4,075,864 A | 2/1978 | Schrader |
| 4,185,687 A | 1/1980 | Stockman |
| 4,316,256 A | 2/1982 | Hendricks et al. |
| 4,382,544 A | 5/1983 | Stewart |
| 4,399,031 A | 8/1983 | Imano et al. |
| 4,420,794 A | 12/1983 | Anderson |
| 4,606,401 A | 8/1986 | Levine |
| 4,730,941 A | 3/1988 | Levine et al. |
| 4,733,719 A | 3/1988 | Levine |
| 4,838,482 A | 6/1989 | Vogelzang |
| 4,948,040 A | 8/1990 | Kobayashi et al. |
| 4,967,382 A | 10/1990 | Hall |
| 5,023,432 A | 6/1991 | Boykin |
| 5,038,851 A | 8/1991 | Mehta |
| 5,171,486 A | 12/1992 | Penno |
| 5,230,482 A | 7/1993 | Ratz et al. |
| 5,259,445 A | 11/1993 | Pratt et al. |
| 5,289,362 A | 2/1994 | Liebl et al. |
| 5,428,964 A | 7/1995 | Lobdell |
| 5,482,209 A | 1/1996 | Cochran et al. |
| 5,491,615 A | 2/1996 | Nichols |
| 5,547,017 A | 8/1996 | Rudd |
| 5,566,879 A | 10/1996 | Longtin |
| 5,673,850 A | 10/1997 | Uptegraph |
| 5,697,552 A | 12/1997 | McHugh et al. |
| 5,765,636 A | 6/1998 | Meyer et al. |
| 5,782,296 A | 7/1998 | Mehta |
| 5,795,505 A | 8/1998 | Penno |
| 5,873,519 A | 2/1999 | Beilfuss |
| 5,924,486 A | 7/1999 | Ehlers et al. |
| 5,937,942 A | 8/1999 | Bias et al. |
| 5,983,146 A | 11/1999 | Sarbach |
| 6,116,512 A | 9/2000 | Dushane |
| 6,196,467 B1 | 3/2001 | Dushane |
| 6,205,533 B1 | 3/2001 | Margolous et al. |
| 6,211,782 B1 | 4/2001 | Sandelman et al. |
| 6,213,404 B1 | 4/2001 | Dushane |
| 6,241,156 B1 | 6/2001 | Kline et al. |
| 6,304,803 B1 | 10/2001 | Dao |
| 6,315,211 B1 | 11/2001 | Sartain |
| 6,318,639 B1 | 11/2001 | Toth |
| 6,415,023 B2 | 1/2002 | Iggulden |
| 6,435,418 B1 | 8/2002 | Toth et al. |
| 6,478,233 B1 | 11/2002 | Shah |
| 6,499,038 B2 | 12/2002 | Kitayama |
| 6,502,758 B2 | 1/2003 | Cottrell |
| 6,549,870 B2 | 4/2003 | Proffitt et al. |
| 6,595,430 B1 | 7/2003 | Shah |
| 6,617,954 B2 | 9/2003 | Firestine |
| 6,621,507 B1 | 9/2003 | Shah |
| 6,628,997 B1 | 9/2003 | Fox et al. |
| 6,714,222 B1 | 3/2004 | Bjorn et al. |
| 6,783,079 B2 | 8/2004 | Carey et al. |
| 6,814,299 B1 | 11/2004 | Carey |
| 6,824,069 B2 | 11/2004 | Rosen |
| 6,851,621 B1 | 2/2005 | Wacker et al. |
| 6,892,547 B2 | 5/2005 | Strand |
| 6,988,671 B2 | 1/2006 | DeLuca |
| 7,003,378 B2 | 2/2006 | Poth |
| 7,028,912 B1 | 4/2006 | Rosen |
| 7,047,092 B2 | 5/2006 | Wimsatt |
| 7,050,026 B1 | 5/2006 | Rosen |
| 7,055,759 B2 | 6/2006 | Wacker et al. |
| D524,663 S | 7/2006 | Moore |
| D525,154 S | 7/2006 | Moore |
| D527,288 S | 8/2006 | Moore |
| D527,658 S | 9/2006 | Moore |
| D530,633 S | 10/2006 | Moore |
| 7,114,554 B2 | 10/2006 | Bergman et al. |
| D531,528 S | 11/2006 | Moore |
| 7,142,948 B2 | 11/2006 | Metz |
| D533,793 S | 12/2006 | Moore |
| D534,088 S | 12/2006 | Moore |
| 7,146,253 B2 | 12/2006 | Hoog et al. |
| D534,443 S | 1/2007 | Moore |
| 7,156,317 B1 | 1/2007 | Moore |
| 7,156,318 B1 | 1/2007 | Rosen |
| D536,271 S | 2/2007 | Moore |
| 7,181,317 B2 | 2/2007 | Amundson et al. |
| 7,222,800 B2 | 5/2007 | Wruck |
| 7,225,054 B2 | 5/2007 | Amundson et al. |
| 7,274,972 B2 | 9/2007 | Amundson et al. |
| 7,287,709 B2 | 10/2007 | Proffitt et al. |
| 7,302,642 B2 | 11/2007 | Smith et al. |
| 7,306,165 B2 | 12/2007 | Shah |
| 7,320,110 B2 | 1/2008 | Shah |
| 7,360,717 B2 | 4/2008 | Shah |
| 7,438,469 B1 | 10/2008 | Moore |
| 7,454,269 B1 | 11/2008 | Dushane et al. |
| 7,489,303 B1 | 2/2009 | Pryor |
| 7,513,438 B2 | 4/2009 | Mueller |
| 7,556,207 B2 | 7/2009 | Mueller et al. |
| 7,565,813 B2 | 7/2009 | Pouchak |
| 7,575,179 B2 | 8/2009 | Morrow et al. |
| 7,584,897 B2 | 9/2009 | Schultz et al. |
| 7,593,212 B1 | 9/2009 | Toth |
| 7,604,046 B2 | 10/2009 | Bergman et al. |
| 7,614,567 B2 | 11/2009 | Chapman, Jr. et al. |
| 7,636,604 B2 | 12/2009 | Bergman et al. |
| 7,693,582 B2 | 4/2010 | Bergman et al. |
| 7,693,583 B2 | 4/2010 | Wolff et al. |
| 7,703,694 B2 | 4/2010 | Mueller et al. |
| 7,706,923 B2 | 4/2010 | Amundson et al. |
| 7,748,225 B2 | 7/2010 | Butler et al. |
| 7,702,421 B2 | 8/2010 | Sullivan et al. |
| 7,775,454 B2 | 8/2010 | Mueller et al. |
| 7,784,291 B2 | 8/2010 | Butler et al. |
| 7,784,705 B2 | 8/2010 | Kasper et al. |
| 7,801,646 B2 | 9/2010 | Amundson et al. |
| 7,802,618 B2 | 9/2010 | Simon |
| 7,845,576 B2 | 12/2010 | Siddaramanna |
| 7,861,941 B2 | 1/2011 | Schultz et al. |
| 7,867,646 B2 | 1/2011 | Rhodes |
| 7,941,819 B2 | 5/2011 | Stark |
| 7,954,726 B2 | 6/2011 | Siddaramanna et al. |
| 7,963,454 B2 | 6/2011 | Sullivan |
| D643,318 S | 8/2011 | Morrow |
| 7,992,794 B2 | 8/2011 | Leen et al. |
| 8,066,263 B1 | 11/2011 | Soderlund |
| 8,083,154 B2 | 12/2011 | Schultz et al. |
| 8,091,795 B1 * | 1/2012 | McLellan .......... G05D 23/1923 236/51 |
| 8,167,216 B2 | 5/2012 | Schultz et al. |
| 8,175,782 B2 | 5/2012 | Gepperth et al. |
| D662,837 S | 7/2012 | Morrow |

(56) References Cited

U.S. PATENT DOCUMENTS

| | | | |
|---|---|---|---|
| D662,838 S | 7/2012 | Morrow | |
| D662,839 S | 7/2012 | Morrow | |
| D662,840 S | 7/2012 | Morrow | |
| D663,224 S | 7/2012 | Morrow | |
| 8,219,251 B2 | 7/2012 | Amundson et al. | |
| 8,239,067 B2 | 8/2012 | Amundson et al. | |
| 8,239,922 B2 | 8/2012 | Sullivan | |
| 8,244,383 B2 | 8/2012 | Bergman et al. | |
| 8,280,536 B1 | 10/2012 | Fadell et al. | |
| 8,346,396 B2 | 1/2013 | Amundson et al. | |
| 8,387,892 B2 | 3/2013 | Koster et al. | |
| 8,517,088 B2 | 8/2013 | Moore et al. | |
| 8,538,588 B2 | 9/2013 | Kasper | |
| 8,549,658 B2 | 10/2013 | Kolavennu et al. | |
| 8,620,460 B2 | 12/2013 | Eergman et al. | |
| 8,689,353 B2 | 4/2014 | Bünter | |
| 8,690,074 B2 | 4/2014 | Moore et al. | |
| 8,701,210 B2 | 4/2014 | Cheng et al. | |
| 8,733,667 B2 | 5/2014 | Moore et al. | |
| 8,950,687 B2 | 2/2015 | Bergman | |
| 8,978,994 B2 | 3/2015 | Moore et al. | |
| 9,014,860 B2 | 4/2015 | Moore et al. | |
| 9,201,431 B2 | 12/2015 | Lyle | |
| 9,304,676 B2 | 4/2016 | Poplawski | |
| 9,989,273 B2 | 6/2018 | Read et al. | |
| 2001/0003451 A1 | 6/2001 | Armstrong | |
| 2002/0065809 A1 | 5/2002 | Kitayama | |
| 2002/0096572 A1 | 7/2002 | Chene et al. | |
| 2004/0133314 A1 | 7/2004 | Ehlers | |
| 2004/0193324 A1 | 9/2004 | Hoog | |
| 2004/0230402 A1 | 11/2004 | Jean | |
| 2004/0245352 A1 | 12/2004 | Smith | |
| 2004/0256472 A1 | 12/2004 | DeLuca | |
| 2004/0260427 A1 | 12/2004 | Wimsatt | |
| 2005/0027997 A1 | 2/2005 | Ueno et al. | |
| 2005/0033707 A1 | 2/2005 | Ehlers | |
| 2005/0040248 A1 | 2/2005 | Wacker | |
| 2005/0040249 A1 | 2/2005 | Wacker | |
| 2005/0044906 A1 | 3/2005 | Spielman | |
| 2005/0082836 A1 | 4/2005 | Lagerwey | |
| 2005/0108620 A1 | 5/2005 | Allyn et al. | |
| 2005/0119793 A1* | 6/2005 | Amundson | G05B 19/0426 |
| | | | 700/276 |
| 2005/0194457 A1 | 9/2005 | Dolan | |
| 2005/0198591 A1 | 9/2005 | Jarrett | |
| 2006/0030954 A1 | 2/2006 | Bergman | |
| 2006/0290140 A1 | 6/2006 | Yoshida | |
| 2006/0220386 A1 | 10/2006 | Wobben | |
| 2007/0045429 A1 | 3/2007 | Chapman, Jr. | |
| 2007/0045441 A1 | 3/2007 | Ashworth | |
| 2007/0114291 A1 | 5/2007 | Pouchak | |
| 2007/0221741 A1 | 9/2007 | Wagner | |
| 2007/0228182 A1 | 10/2007 | Wagner et al. | |
| 2007/0228183 A1* | 10/2007 | Kennedy | F24F 11/30 |
| | | | 236/1 C |
| 2007/0257120 A1 | 11/2007 | Chapman, Jr. et al. | |
| 2007/0278320 A1 | 12/2007 | Lunacek et al. | |
| 2008/0271475 A1* | 11/2008 | Wuesthoff | F25D 17/065 |
| | | | 62/447 |
| 2009/0001182 A1 | 1/2009 | Siddaramanna | |
| 2009/0024965 A1 | 1/2009 | Zhdankin | |
| 2009/0045263 A1 | 2/2009 | Mueller et al. | |
| 2009/0057424 A1 | 3/2009 | Sullivan et al. | |
| 2009/0057427 A1 | 3/2009 | Geadelmann | |
| 2009/0062964 A1 | 3/2009 | Sullivan | |
| 2009/0129931 A1 | 5/2009 | Stiesdal | |
| 2009/0140056 A1* | 6/2009 | Leen | F24F 11/0086 |
| | | | 236/49.3 |
| 2009/0140064 A1* | 6/2009 | Schultz | F24F 11/006 |
| | | | 236/51 |
| 2010/0031193 A1 | 2/2010 | Stark | |
| 2010/0070089 A1 | 3/2010 | Harrod et al. | |
| 2010/0117975 A1 | 5/2010 | Cho et al. | |
| 2010/0127502 A1 | 5/2010 | Uchino et al. | |
| 2010/0145528 A1 | 6/2010 | Bergman et al. | |
| 2010/0261465 A1 | 10/2010 | Rhoads et al. | |
| 2010/0318200 A1 | 12/2010 | Foslien | |
| 2011/0004825 A1 | 1/2011 | Wallaert | |
| 2011/0031806 A1 | 2/2011 | Altonen et al. | |
| 2011/0046792 A1 | 2/2011 | Imes | |
| 2011/0054710 A1* | 3/2011 | Imes | F24F 11/006 |
| | | | 700/286 |
| 2011/0112998 A1 | 5/2011 | Abe | |
| 2011/0261002 A1 | 10/2011 | Verthein | |
| 2011/0273394 A1 | 11/2011 | Young | |
| 2012/0067561 A1 | 3/2012 | Bergman | |
| 2012/0074710 A1 | 3/2012 | Yoshida | |
| 2012/0131504 A1 | 5/2012 | Fadell | |
| 2012/0168524 A1 | 7/2012 | Moore et al. | |
| 2012/0169675 A1 | 7/2012 | Moore et al. | |
| 2012/0203379 A1 | 8/2012 | Sloo | |
| 2012/0221149 A1 | 8/2012 | Kasper | |
| 2012/0229521 A1 | 9/2012 | Hales, IV | |
| 2012/0232703 A1* | 9/2012 | Moore | F24F 11/0086 |
| | | | 700/278 |
| 2012/0239221 A1 | 9/2012 | Mighdoll | |
| 2012/0329528 A1 | 12/2012 | Song | |
| 2013/0024685 A1 | 1/2013 | Kolavennu et al. | |
| 2013/0032414 A1 | 2/2013 | Yilmaz | |
| 2013/0090767 A1 | 4/2013 | Bruck et al. | |
| 2013/0056989 A1 | 5/2013 | Sabhapathy | |
| 2013/0123991 A1 | 5/2013 | Richmond | |
| 2013/0211783 A1 | 8/2013 | Fisher et al. | |
| 2013/0215088 A1 | 8/2013 | Son et al. | |
| 2013/0263034 A1* | 10/2013 | Bruck | F24F 11/0086 |
| | | | 715/771 |
| 2013/0338838 A1* | 12/2013 | Moore | F24F 11/0086 |
| | | | 700/278 |
| 2013/0345883 A1 | 12/2013 | Sloo | |
| 2014/0081465 A1 | 3/2014 | Wang et al. | |
| 2014/0152631 A1 | 6/2014 | Moore et al. | |
| 2014/0156087 A1 | 6/2014 | Amundson | |
| 2014/0163746 A1 | 6/2014 | Drew | |
| 2014/0254577 A1 | 9/2014 | Wright et al. | |
| 2014/0316581 A1 | 10/2014 | Fadell et al. | |
| 2014/0317501 A1* | 10/2014 | Brasseur | G06F 8/65 |
| | | | 715/702 |
| 2014/0319233 A1 | 10/2014 | Novotny | |
| 2015/0081568 A1 | 3/2015 | Land, III | |
| 2015/0095843 A1* | 4/2015 | Greborio | G06F 3/0481 |
| | | | 715/784 |
| 2015/0100167 A1 | 4/2015 | Sloo et al. | |
| 2015/0167995 A1 | 6/2015 | Fadell | |
| 2015/0233595 A1 | 8/2015 | Fadell | |
| 2015/0280935 A1 | 10/2015 | Poplawski et al. | |
| 2016/0062618 A1 | 3/2016 | Fagan | |
| 2016/0123618 A1 | 5/2016 | Hester et al. | |
| 2016/0124628 A1* | 5/2016 | Poplawski | F24F 11/0086 |
| | | | 715/771 |
| 2016/0124828 A1 | 5/2016 | Moore et al. | |
| 2016/0131385 A1 | 5/2016 | Poplawski et al. | |
| 2016/0154576 A1 | 6/2016 | Moore et al. | |
| 2017/0103689 A1 | 4/2017 | Moore et al. | |
| 2017/0131825 A1 | 5/2017 | Moore et al. | |
| 2017/0300025 A1 | 10/2017 | Moore et al. | |
| 2017/0364104 A1 | 12/2017 | Poplawski et al. | |
| 2018/0031266 A1 | 2/2018 | Atchison | |

FOREIGN PATENT DOCUMENTS

| | | |
|---|---|---|
| JP | 2004218436 | 8/2004 |
| JP | 2006009596 | 1/2006 |
| KR | 20050034417 | 4/2005 |

OTHER PUBLICATIONS

ComfortLink II XL950 Control, User Guide, Trane U.S. Inc., 2011.
Cardio lie Installer's Guide, System Version 2.5xx, 5th edition, 2008, Secant Home Automation Inc.

(56) References Cited

OTHER PUBLICATIONS

What you should know about flexible displays (FAQ); http://news.cnet.com/8301-1035_3-57607171-94/what-you-should-know-about-flexible-d . . . ; Nov. 25, 2013.
Brae8urn Systems LLC, "Temperature Limiting Adjustments for heating and Cooling (1000 Series)", Mportant Installation Instructions.

* cited by examiner

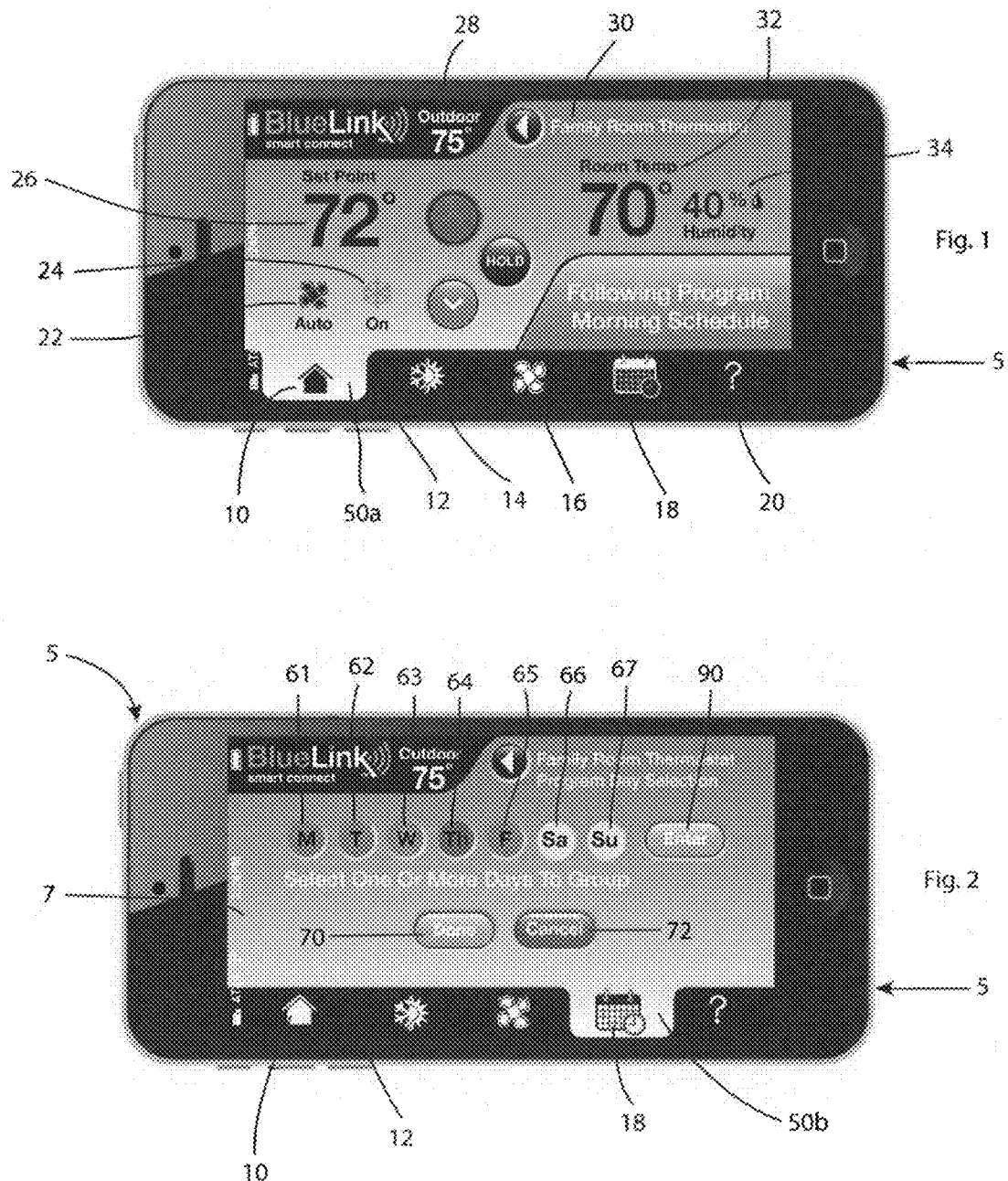

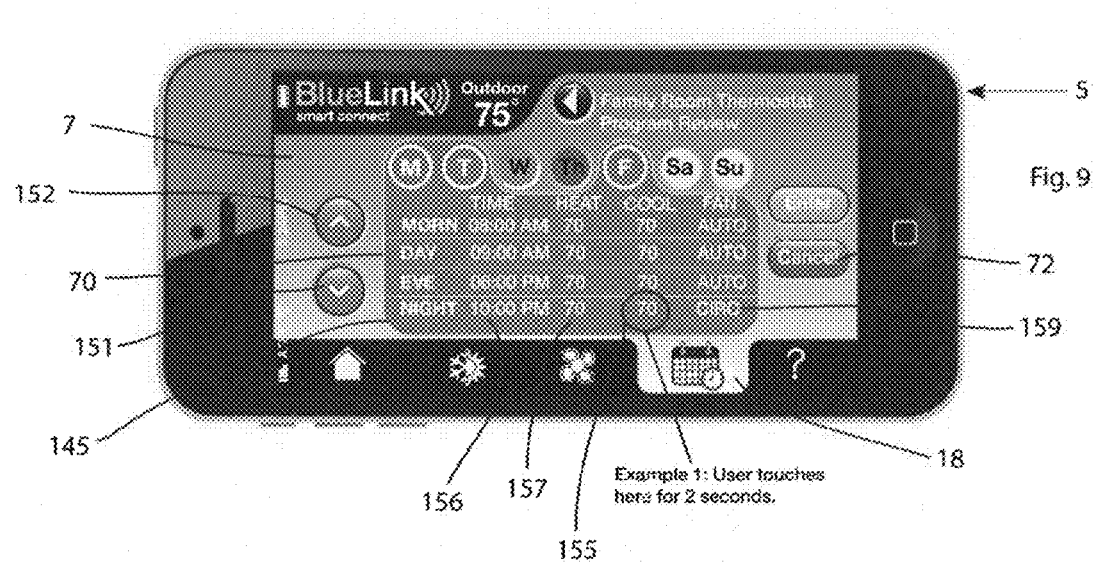
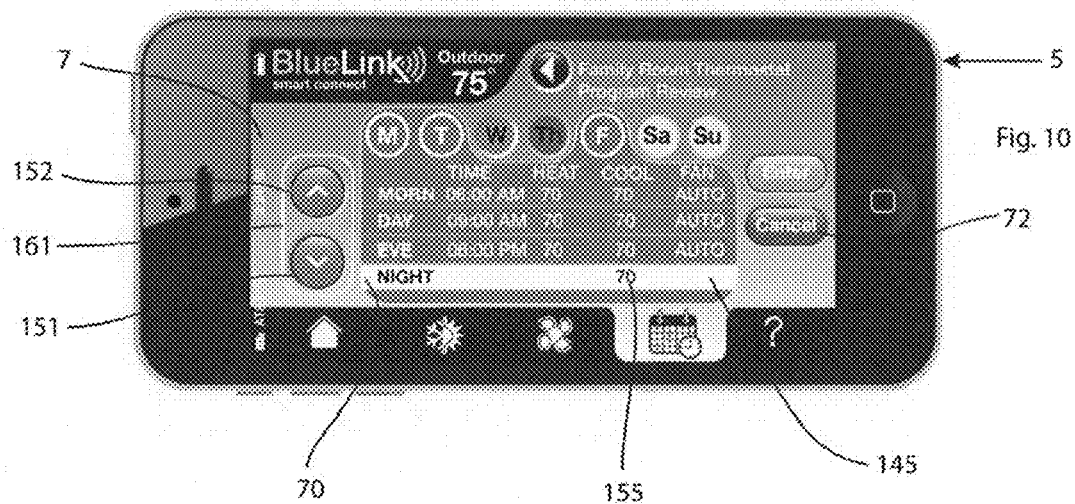

QUICK EDIT SYSTEM FOR PROGRAMMING A THERMOSTAT

This application claims priority to provisional application No. 62/072,812 filed Oct. 30, 2014.

The present invention pertains to a display for rapid programming of a thermostat in order to control multiple functions of an HVAC system controlled by the thermostat.

BACKGROUND

Thermostats typically have multiple functions that require user input, such as setting time of day, day of week, programming temperature set points or programming user settings. Control panels typically include an assortment of buttons for operating the thermostat and adjusting the settings. Adjustment of the thermostat settings using the assortment of buttons and multiple programming screens can often times be confusing to the user, require detailed review of the user manual and consume much time in order to properly operate the thermostat and adjust the settings to the user's liking.

In some cases a liquid crystal display (LCD) may be provided that includes touch sensitive areas populated on the display screen. The touch sensitive area may include numerals, word phrases or graphics (collectively, "icons") that appear on the display screen. By touching the appropriate icon, the user can make adjustments to the functioning of the thermostat and activate specific modes of operation or make setting adjustments. Some thermostats are known to have mechanical buttons or switches ("hard buttons"). Such hard buttons are commonly used in combination with touch sensitive areas ("soft buttons") on a LCD. Some thermostats have multiple hard buttons on different portions of the thermostat housing.

Typically the user must program the thermostat by using the soft or hard buttons to adjust set-points (e.g. time and corresponding temperature) for each day of the week by moving between 2-3 set-up screens. Once a thermostat is programmed it is common to edit the initial settings. The programming may include setting hour, minute, temperature and fan settings; the total number steps and inputs required to complete the re-programming for seven days may exceed 100 steps and require flip-flopping between set-up screens hundreds of times. The present invention overcomes many of the above mentioned disadvantages of previously known thermostats and allows for more rapid re-programming of the thermostat.

SUMMARY

The present invention provides for a method for programming a thermostat comprising the steps of providing a thermostat having a display and buttons for controlling at least two modes of a thermostat, including a heating mode and a cooling mode and a thermostat capable of controlling the heating and cooling modes for each of seven days.

The invention includes a control for adjusting a thermostat comprising a controller including a microprocessor and memory for storing a user interface, a display screen including a touch sensitive screen, the display screen coupled to the microprocessor and memory; the user interface including a main screen having a temperature icon, a time icon, an adjustment icon, and temperature and time set points for at least two days of the week and the microprocessor programmed to highlight one of the time or temperature icons upon selection of said one of the time or temperature icons and thereafter, without navigating away from the main screen, upon selection of the adjustment touch pad icon, the microprocessor programmed to adjust the time or temperature set point.

In an embodiment, the adjustment touch pad icon provides an increment/decrement function in order to a) increase or decrease a temperature set point, respectively, or b) move forward or backward a time set point, respectively and the increase, decrease, forward or backward adjustments provide a quick edit function. In an embodiment, activation of one of the time or temperature icons occurs by depressing the time or temperature icon for a first preselected duration in order to provide for programming. In an embodiment, the first preselected duration is between 1-5 seconds and the touch pad icon includes an up arrow and down arrow.

In an embodiment, the buttons may be mechanical buttons disposed on a housing of the thermostat. In an embodiment, the buttons may be touch sensitive areas displayed on a display screen of the thermostat. In an embodiment, the buttons may be a combination of a mechanical button and a touch sensitive area button. In an embodiment, a mechanical button may be a rocker switch.

In an embodiment, the method may comprise the step of selecting the temperature and duration for a fractional day period, such as a morning period, a daytime period, an evening period, a night period, occupied period or unoccupied period. In an embodiment, the method may further comprise the step of selecting a fan setting.

The present invention may further comprise a thermostat display for programming a thermostat comprising a thermostat including a system button and a program button, a display screen including a seven day icon, a temperature icon and a time icon, wherein activation of the program button selects the seven day icon and activation of the system button provides for selection of one of a heat mode and a cool mode and for programming all seven days by adjustment of the temperature and time icons.

In an embodiment, the display includes day icons that may comprise an alpha-numeric representation of each of the seven days of the week. In an embodiment, the icon may comprise "M TU W TH F SA SU>, <, ENTER, CANCEL, SAVE, OK, NEXT, CHANGE MODE, RETURN GROUP, GROUP REGROUP and DAYS." The main screen may be devoid of any message pertaining to adjustment of multiple day set points and a separate help screen provides the sole message pertaining to adjustment of multiple day set points. In an embodiment, the temperature and time icons may comprise an alpha-numeric representation. In an embodiment, an adjustment button/icon rocker switch may be provided for adjusting set points for temperature and time of the modes. In an embodiment, a fan button may be provided for selecting a fan mode for the heat and cool modes.

In an embodiment, the set point icon may include a pre-determined time trigger so that pressing the set point icon for a period of time greater than the pre-determined time trigger results in activation of a quick edit programming mode. In an embodiment, the system adjustment button and set point icon may be touch sensitive areas displayed on the display screen of the thermostat.

The present invention may also provide for a computer readable media having stored thereon computer executable instructions for programming a thermostat, the instructions, when executed by a computing device, perform the steps comprising displaying a system button, displaying a program adjustment button, displaying a time icon, displaying a temperature icon, selecting one of the temperature and time icons upon activation of the adjustment button and programming for the heat mode or cool mode by adjusting set points via the adjustment icon.

In an embodiment, the programming adjustment button may comprise a graphical representation of UP/DOWN arrows. In an embodiment, the time and temperature icons may comprise an alpha-numeric representations. In an embodiment, a rocker switch for adjusting the set points for temperature and time modes may be provided for a period. In an embodiment, the complete programming for the heating or cooling may be provided without requiring navigation to a different screen to fully program the thermostat.

BRIEF DESCRIPTION OF THE DRAWINGS

For a better understanding of the subject invention, reference may be had to embodiments shown in the attached drawings in which:

FIGS. 1-6 are screen shots of the present invention;

FIGS. 9-18 are screen shots of the present invention.

DETAILED DESCRIPTION

Figure 3:
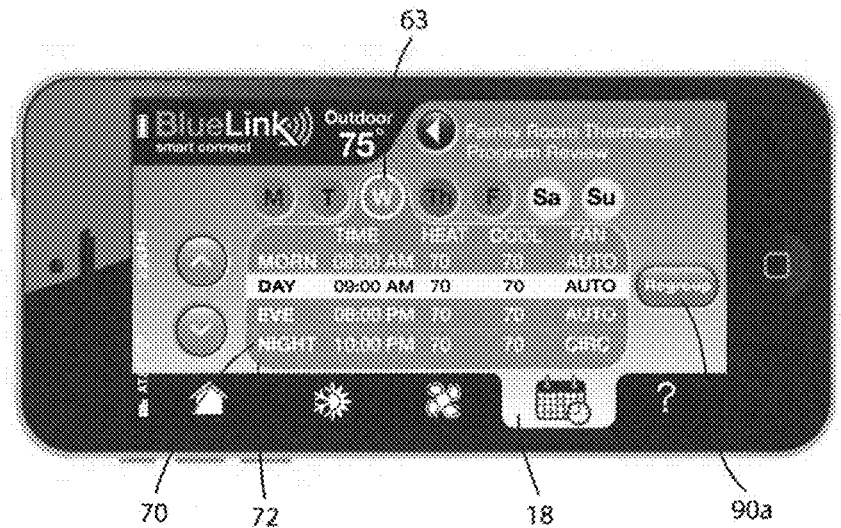

The present invention pertains to a programmer for an electronic control device, such as a thermostat and in particular, a graphical user interface for an application ("app") for programming a control device via a remote device such as a smartphone.

Smartphones are more commonly being used to interface and control household items such as alarms, appliances and thermostats. While use of a smartphone allows more flexibility for the user to make adjustments and control items from remote locations, such phone user interfaces can be difficult to use and navigate. The present invention resolves such issues.

Each of the FIGS. 1-6 and 9-16 depict a smartphone 5 housing display screen 7 and the pertinent display screen for operation and control of a thermostat. However, it is to be understood that the display depicted in each of these figures could also be a display that is provided directly on a thermostat 210 (FIG. 8) or other appliance such as a personal computer, table, refrigerator or smart television. In an embodiment, the display screens are pages that are displayed by an app loaded on to a smartphone, as is known by traditional means. Also, the programming and control of the app on a smartphone allows for communication with a remote thermostat or other appliance via well-known wireless connections, or Wi-Fi or other wireless communication standards such as CDMA2000/IMT-2000, or IEEE 802.12.

It is to be understood that each of the icons and "buttons" are touchpads provided on the display of the smartphone device 5, or the thermostat itself. In an alternate embodiment, the present invention may be used on a device that is not touchscreen capable and by using a mouse or other means of scrolling over the icon and selecting using a click of the keyboard or mouse, the operation of the invention will correspond to the descriptions below.

Turning to FIG. 1, a home page is displayed, which is designated by the icon 10 for a home. The navigation bar 12 includes the icons for home 10, system mode (heating, cooling) 14, fan mode 16, programming mode (programming) 18 and help ("?") 20.

The display in the home mode also includes icons for the fan 22. In FIG. 1 the fan is depicted as being in auto mode. An icon for heat 24 is depicted in the on mode. A temperature set point icon 26 is shown with a set point of 72 degrees Fahrenheit. Outdoor temperature icon 28 depicts the outdoor temperature as being 75 degrees Fahrenheit. Thermostat identification text 30 indicates that the display is in the "Home mode for the family room thermostat." Room temperature icon 32 depicts the room temperature is currently at 70 degrees Fahrenheit. A humidity icon 34 currently indicates 40% humidity. In the center of the display the "up" adjustment icon 40 is used to increment the setting upward. The "down" icon 42 is used to decrement the setting information. The hold button 44 is generally used to hold the settings at their current setting parameter.

The invention is discussed further with respect to the selection of the programming function identified by icon 18. Turning to FIG. 2, when the programming icon 18 on the navigation bar 12 is selected, a graphical interface selection cue appears around the programming icon 18. It can be seen that the graphical interface cue 50b surrounds the programming (calendar) icon 18. In a preferred embodiment, the cue 50b will be a lighter color than the rest of the control bar 12. Upon selecting the programming icon 18, the graphical interface cue 50a (FIG. 1) was eliminated from the area surrounding the home icon 10 and a cue is displayed at the programming icon 18. The display of FIG. 2 depicts day of the week icons 61-67, representing the days of the week, Monday through Sunday. Also provided is an enter button 170 and cancel button 72.

By grouping days of the week, including single days, for example, Wednesday; the user can schedule that single day by pressing the "W" icon 63 and then selecting group 90. Turning to FIG. 3, it can be seen that the display changes to the summary mode and includes a main set point table 70. The table 70 generally includes timing and set point temperature data for the user to customize the settings for the control program to operate the thermostat. In an alternate embodiment, the table 70 may be formatted in different ways and organized having different sequences of data from the display depicted in FIG. 3. FIG. 3 provides an example of a table format 70, which includes four segmented time periods providing a row for morning, day, evening and night. Other embodiments could include Occupied and Unoccupied, or Period 1 through N. Following the row for the fourth segment of the day is a time setting row, the heat temperature mode, the cool temperature mode and the fan mode. Each of these functions can be adjusted when the user touches on each alphanumeric display in order to adjust each in turn.

The table 70 is surrounded by a graphical highlight 72. In the embodiment, depicted in FIG. 3, the highlight is a darker color than the main display area. In an embodiment, the graphical highlight 72 may be a color, such as orange. The graphical highlight 72 is linked to the icon for Wednesday 63. As in the previous step, the user has grouped Wednesday to be a single element group. In an embodiment, the graphical highlight 72 is a "bubble" that expands to encompass the Wednesday "W" icon 63. The "bubble" encompasses the table 70 that is being programmed for the day Wednesday. The bubble/graphical highlight provides a clear representation to the user which day of the week is being scheduled. In an alternate embodiment, the graphical highlight 72 linking the table to the day icon 63 could be an arrow or some other graphical indication that the day icon is linked with the table. The linking area 72a between the main graphical highlight 72 is the link to the day icon 63. Upon completion of selecting the appropriate set points for the preferred days of the week, the "Regroup" button 90a may be selected.

Figure 4:
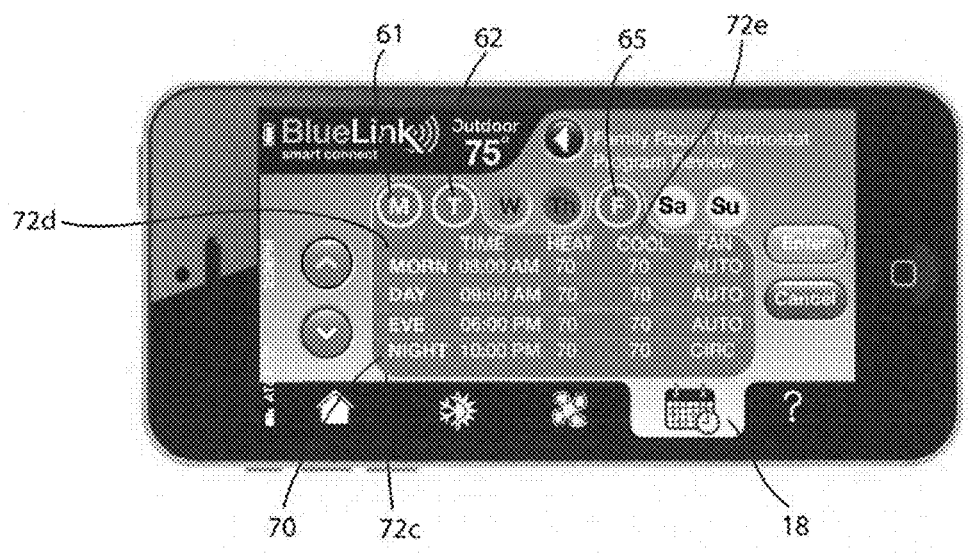

By way of another example, we will return to FIG. 2 where the seven-day icons 61-67 appear. In another phase of programming, a user may wish to select multiple days for programming simultaneously. For example the user may select Monday, Tuesday and Friday as being days that should be programmed in a similar fashion. For example, for someone who works from home on Monday, Tuesday and Friday. By grouping the "M," "T" and "F" icons 61, 62, 65 the app will provide a display of FIG. 4. The table 70 is depicted in FIG. 4, surrounded by graphical highlight 72c which includes graphical highlight linking area 72d and 72e which link the table to the Monday, Tuesday, Friday icons 61, 62, 65. By use of the graphical highlight 72c, d, e the user is constantly reminded that the programming being made by adjustments of the table 70 are adjustments that will be uniform for the 3 days of the week: Monday, Tuesday and Friday.

Figure 5:
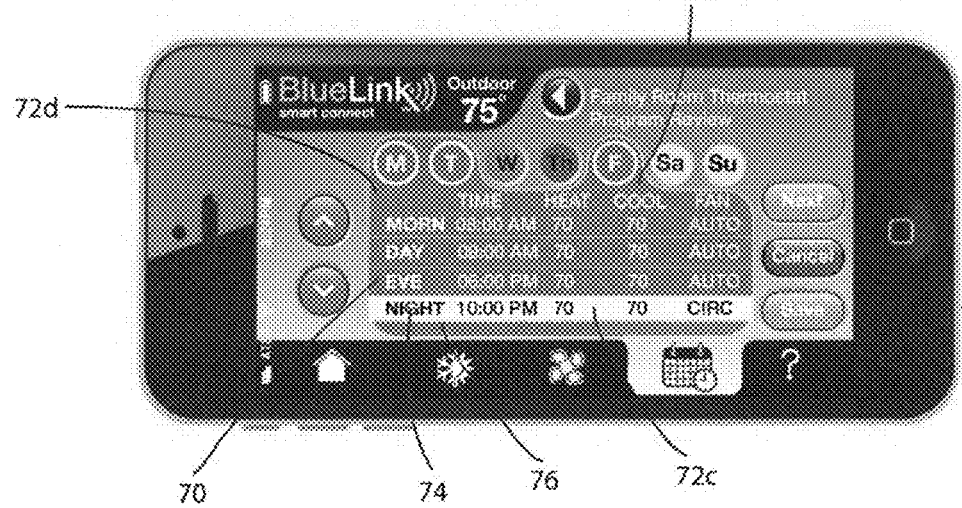

Upon display of the table 70, any of the parameters may be programmed by touching the alphanumeric displays. Turning to FIG. 5 it can be seen that the "NIGHT" function 74 has been selected because a graphical highlight 76, has been placed over the icon for "NIGHT". By displaying the graphical highlight 76 with the icon for "NIGHT" 74, the user is reminded that the night portion (or bottom row) of the table is being programmed. In an embodiment, the graphical highlight 76 has darker shading than the other four segmented portions of the day. For example, the icons for "MORN" "DAY" "EVE" have a white background and the "NIGHT" graphical highlight is darker or a different color. It is noted that during the programming function, while the user may select a different time of day (e.g. MORN DAY EVE NIGHT), the graphical highlight 72 will continuously remain around the table and link to the day icons that were previously selected for the multiple programming step.

Figure 6:
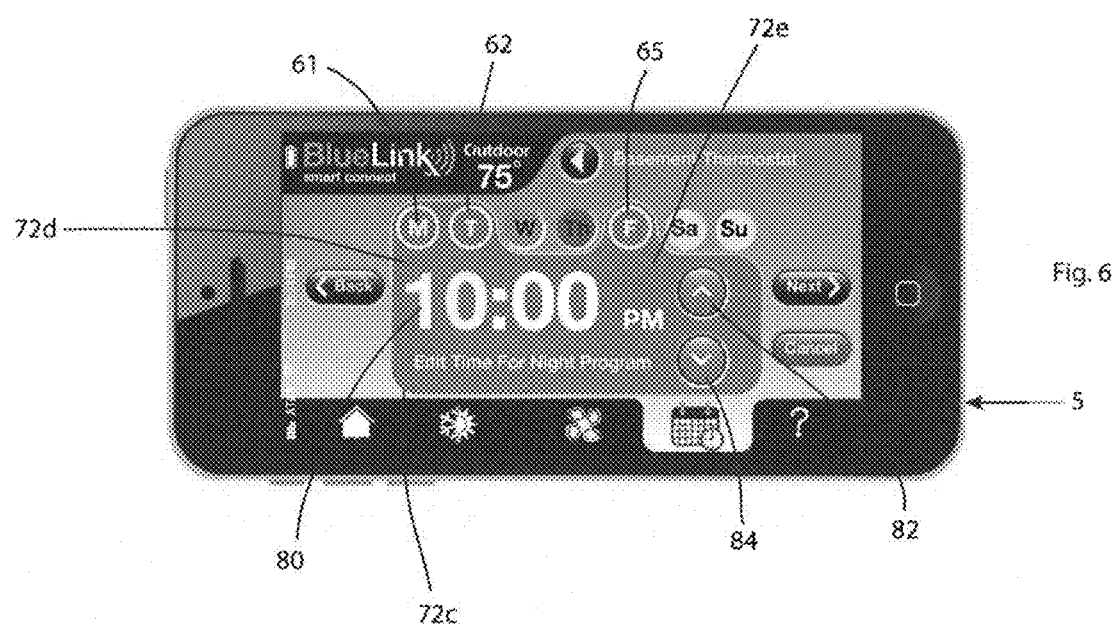

Selecting the "NIGHT" icon 74 will lead to the display of FIG. 6 where the time icon 80 is displayed. In this embodiment, the time icon 80 is designating 10:00 p.m. and facilitates editing and programming of the "Night" portion of the table 70. Although the table 70 has been replaced with the night time icon 80, the previous graphical highlight 72c continues to be displayed including the linking portion 72d that links the graphical highlight 72c to the multiple day icons: Monday Tuesday and Friday, 61, 62 and 65. The up/down buttons 82, 84 may be used to increment or decrement the time setting and allow the user to make the adjustments for the proper heat and cool settings at the proper time of day. Such programming will continue by selecting different portions from the table 70, until each of the desired settings at each of the times of day have been completed for the multiple day selection: Monday Tuesday and Friday.

Figure 7:
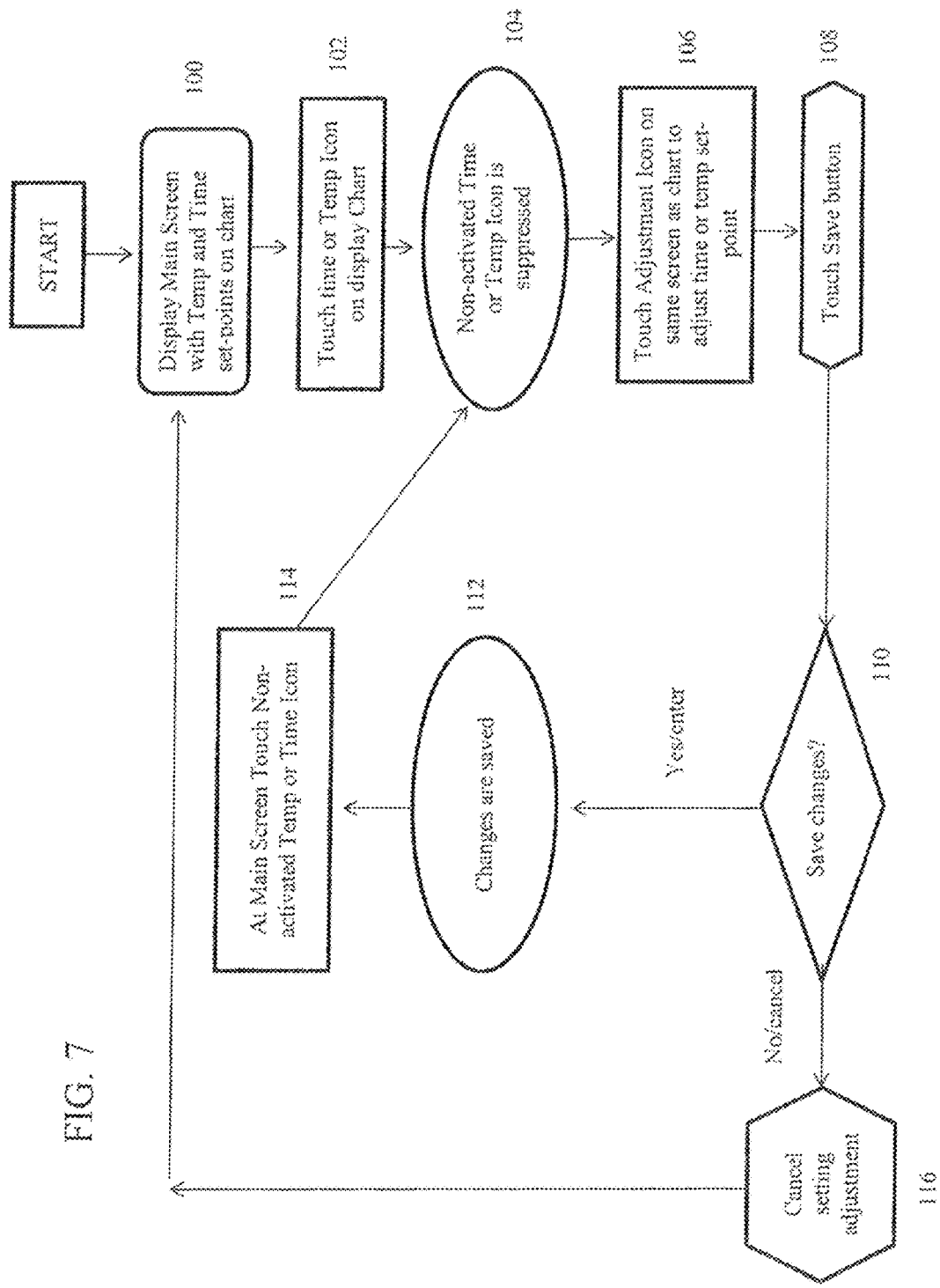
FIG. 7 is a flow diagram of the present invention.

Turnings to FIG. 7, which is a flow diagram of the invention, the steps of the invention will be described in more detail. Also reference to FIGS. 9-16 of the corresponding screenshots will be described. At step 100 the main screen 7 is displayed having a set point table 70 displayed on the remote device 5. As described above, the main set point table 70 includes alphanumeric icons that provide the settings for the thermostat by day of the week and dividing each day by a segment such as morning, day, evening and night. The main set point table 70 includes icons for the set points that represent the time of day and temperature setting for the on or off state of heating, cooling or fan operation. Adjustment icon 151, 152 is displayed adjacent the main table 70. In the embodiment depicted in FIG. 9, the adjustment icon is divided into a pair of touchpad buttons where a down arrow 151 acts as a decrement adjustment and up arrow 152 is an increment adjustment for either the time or temperature. As well, the adjustment icons 151, 152 can act to toggle between the day time segments of night, evening, day, morning on the main set point table 70. In the quick edit state of the present invention, the adjustment icons 151, 152 will only act to increment or decrement the selected temperature or time icon.

At step 102 one of the temperature or time icons displayed on the main chart 70 can be selected. For example, temperature icon 155 may be activated by touching that icon for 0.05 seconds or greater. As shown in FIG. 9, the icon is the alphanumeric "70." So when a user places his or her finger over the "70" icon 155 for 0.5 seconds or longer, the quick edit state will be activated. At step 104 as depicted in FIG. 10, the activation of the quick edit mode will trigger the microprocessor to alter the display of the table 70 by suppressing the non-activated icons. For example, as shown in FIG. 10 the time icon 156 ("10:00 p.m."), heat, set point, temperature icon 157 ("70") and fan icon 159 ("CIRC"), in row 145 of the chart 70, have all been suppressed or omitted from the chart 70 (FIG. 10). Each of those icons 156, 157, 159 are displayed along the row 145 for the Night adjustment in FIG. 9. However, after activation of the quick edit mode as shown in FIG. 10, in the night row 145 of the chart 70, only the activated icon for cooling set point 155 is displayed.

Figure 11:
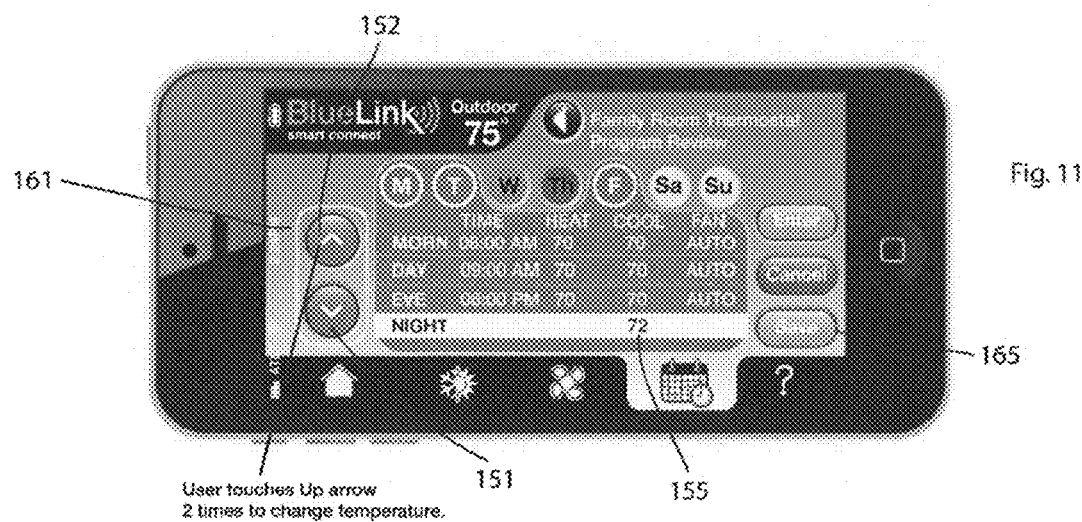

Likewise, upon activation of the quick edit mode, a highlight feature 161 is displayed adjacent to the adjustment icons 151, 152. In an embodiment, the highlight feature 161 is an oval shaped ring that appears circumscribing the touchpad buttons 151, 152. In an alternate embodiment, the highlight feature 161 may act to change the color of the surrounding area of the adjustment icons 151, 152 or change the color of the adjustment icon buttons themselves. At step 106, the selected set point 155 is adjusted by touching the adjustment icon 151, 152. For example, by touching the adjustment icon 152 two times the cooling set point temperature will be incremented by 2 degrees changing the icon from "70" to "72" (FIG. 11). It may be understood that the set point temperature icon for cooling 155 may be adjusted in either direction using the adjustment icon buttons 151, 152.

Figure 12:
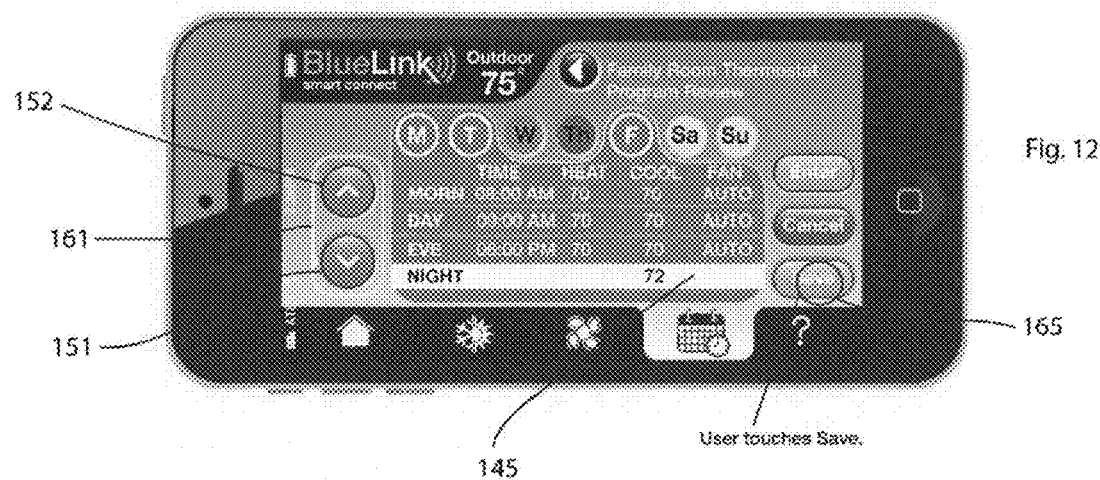
Figure 13:
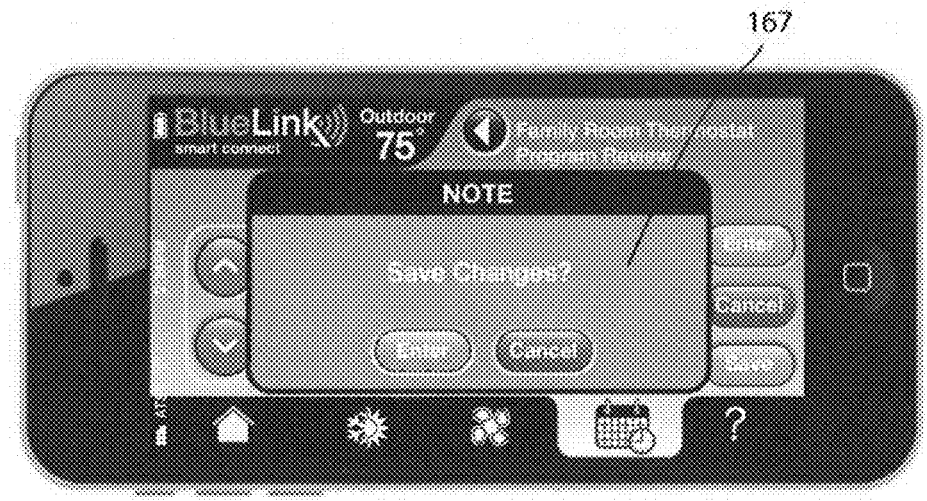
Figure 14:
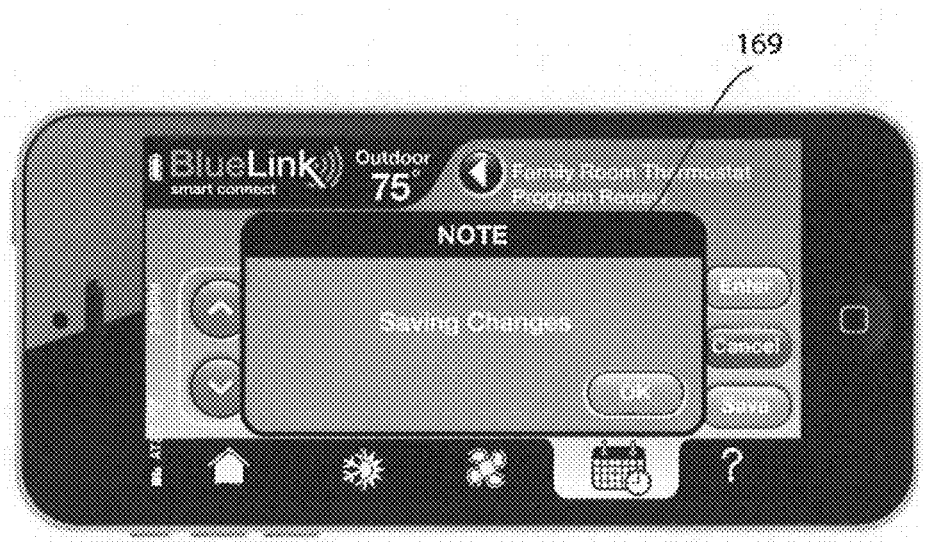

At step 108, the new set point is entered into the memory of the system by touching the save button 165 as shown in FIG. 12. At step 110, a window opens that asks the user if he or she would like to save the changes (FIG. 13). The window 167 includes a button to enter or cancel. If the user decides to cancel the previous selection of the set point at step 116, the setting adjustment is cancelled and the display will return to the main screen as depicted in FIG. 9 and return to step 100 of the flow diagram FIG. 7. If the user agrees to keep the adjustments to the set point, the enter button is selected and at step 112 the changes are saved and as depicted in FIG. 14 a window 169 will indicate the changes are being saved. After the changes are made the main display screen including the set point chart 70, is displayed.

Figure 15:
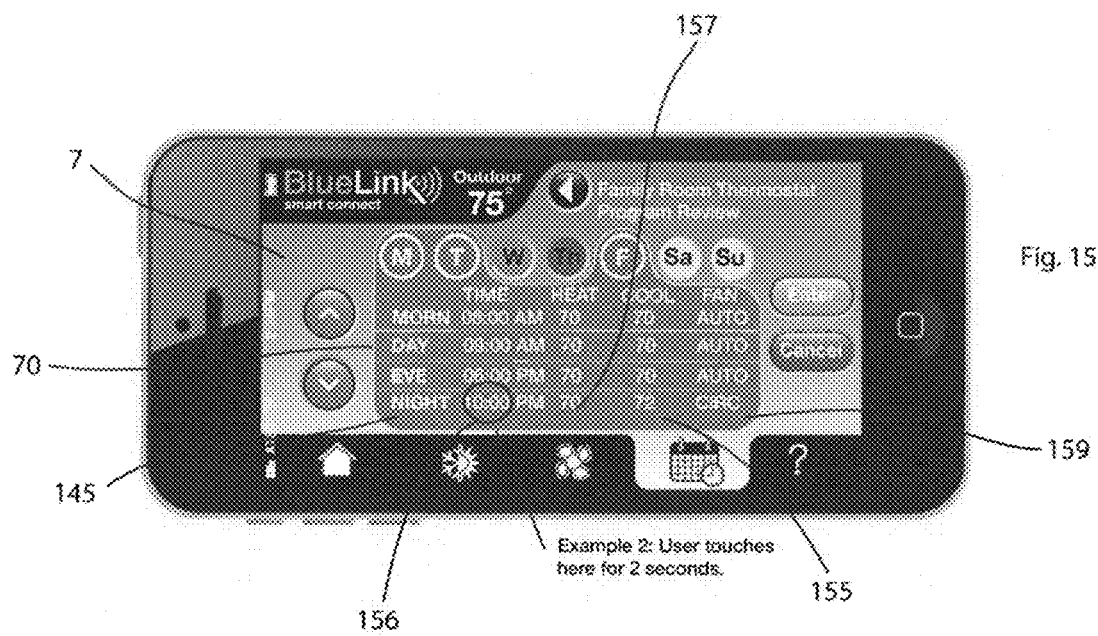

At step 114 the user may then touch the previously non-activated temp or time icon 156 as depicted in FIG. 15. Following the adjustment of the cool set point temperature 155, the table 70 returns to its full display mode where each of the icons in the Night row 145 are displayed and the microprocessor coding for the suppression of the previously omitted icons is triggered OFF, so that the icons appear again on the chart 70. The user may select any of the displayed icons on the chart to continue to adjust the set points for the operation of the thermostat. So as shown in FIG. 15, the icon 156 for the time set point for the night segment of the day is selected. For example, when the user places his or her finger on the set point icon 156 ("10:00 p.m.") for a preselected time period (e.g. one second), the quick edit mode will be activated.

Figure 16:
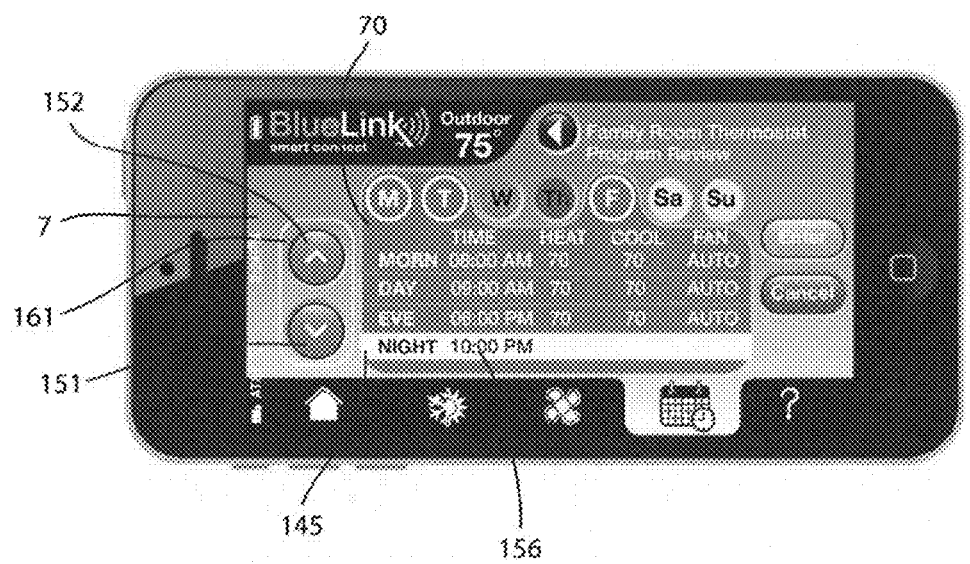

At step 104 the non-activated time or temp icons are suppressed as shown in FIG. 16. As a result of the selection of the set point time icon for the night period the icons 157, 155 and 159 are suppressed, so that they do not appear on the screen 7 or in the chart 70 along the Night row 145. Likewise, the highlight feature 161 appears around the adjustment icons 151, 152 and the time icons 156 may be adjusted by using the adjustment icon buttons 151, 152. For example, in order to select a later time the increment button 152 is pressed to select a later time for the triggering of the night time heating or cooling function. Likewise, if an earlier time is desired the decrement icon 151 will be selected.

Figure 17:
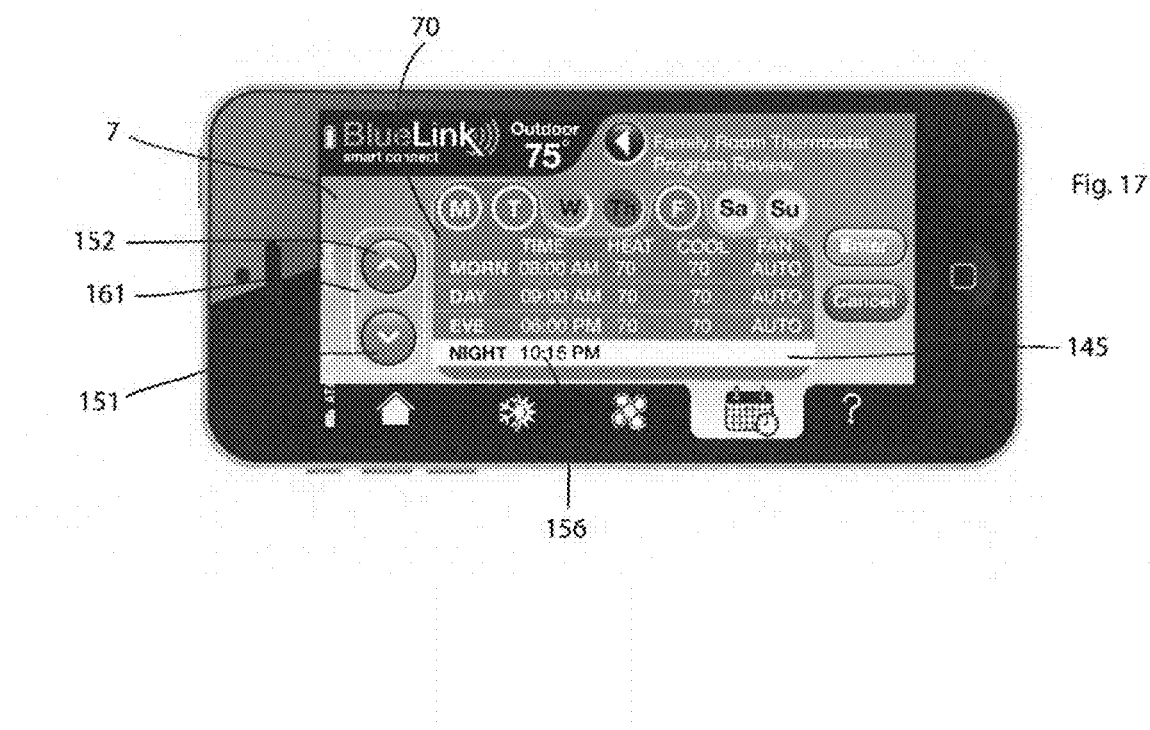

In an embodiment, the processor may be programmed so that each press of the icon adjustment button 151, 152 will move the time in fifteen minute increments. Other programming may be provided to make adjustments in one minute or greater increments as well (step 106, FIG. 16). As shown in FIG. 17, the set point icon 156 has been incremented fifteen minutes and provides an alphanumeric display of "10:15 PM". The remainder of the set point icons in the Night row 145, remain suppressed until the time set point icon 156 is saved.

Again, at step 108 the user can save the changes and agree to save the changes at step 110 and be alerted at step 112. If the changes have been saved and step 114, the main chart is displayed again and the process may continue until all of the desired settings on the chart 70 have been adjusted to the user's liking. Therefore, it is understood that each of these adjustments may be made without departing from the main screen 7. Such a quick edit function can save many steps and time consuming toggling between alternate screens and allow for more efficient use of the controller by the user.

In an embodiment, the display includes day icons that may comprise an alpha-numeric representation of each of the seven days of the week. In an embodiment, the icon may comprise "M TU W TH F SA SU>, <, ENTER, CANCEL, SAVE, OK, NEXT, CHANGE MODE, RETURN GROUP, GROUP REGROUP and DAYS." The main screen may be devoid of any message pertaining to adjustment of multiple day set points and a separate help screen provides the sole message pertaining to adjustment of multiple day set points. In an embodiment, the temperature and time icons may comprise an alpha-numeric representation. In an embodiment, an adjustment button/icon rocker switch may be provided for adjusting set points for temperature and time of the modes. In an embodiment, a fan button may be provided for selecting a fan mode for the heat and cool modes.

The use of the quick edit function may be in combination with more standard editing functions such as discussed above with respect to FIG. 6. Although the description with respect to FIGS. 9-17, provided above are with respect to the Night row 145, it is to be understood that each of the quick edit operations may occur with respect to the Evening, Day or Morning rows, as well and with respect to the fan operation also. For example, the fan settings may be adjusted by using the adjustment icon buttons 151, 152 to toggle between and auto, circulate and program operations of the fan.

Figure 8:
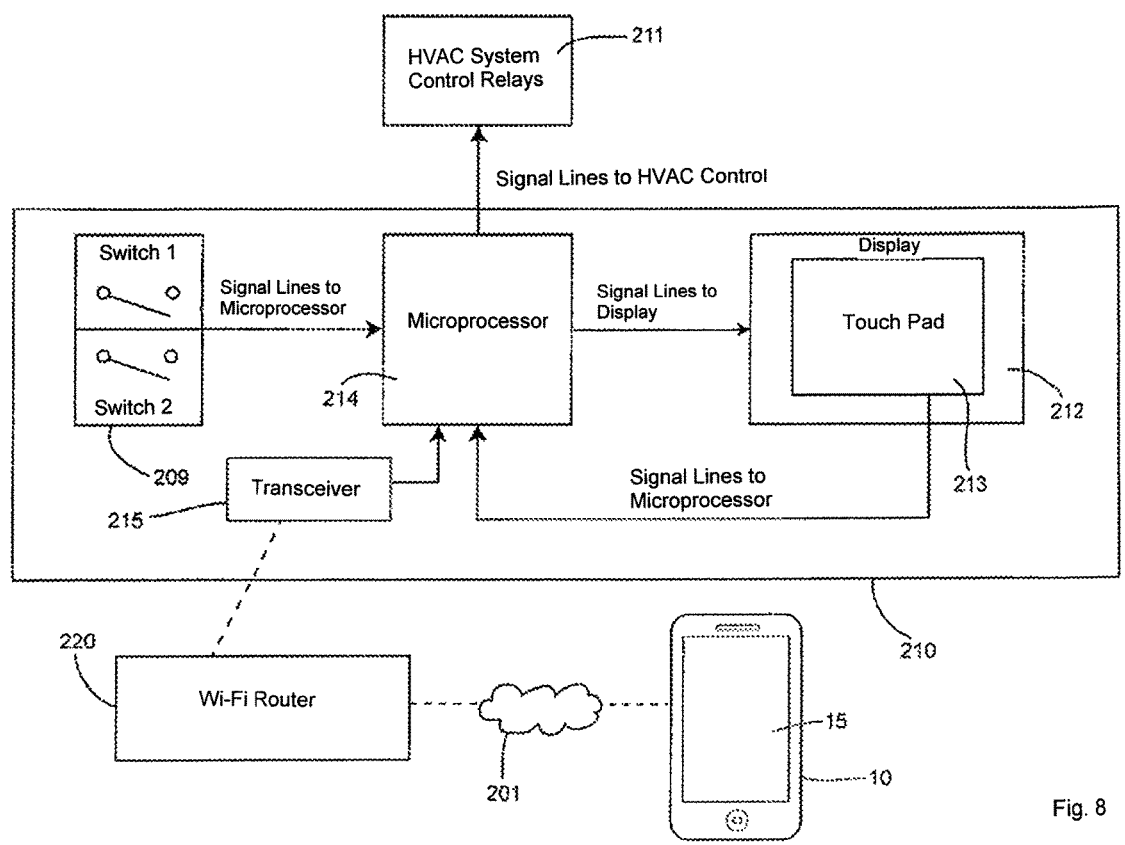
FIG. 8 is a schematic diagram of the present invention.

FIG. 8 depicts the network environment in which the invention operates. In an embodiment, the smartphone 5 links through the internet cloud (e.g. third party servers) to a (Wi-Fi) router 220 to a thermostat 210. The thermostat controls an HVAC system (and its relays) 211. The thermostat includes a mechanical, digital or analog switch 209, a microprocessor 214, display screen 212, touch pad area of the display 212 and a transceiver 215. These components operate the thermostat as is well known in the thermostat industry. Each of the above discussed operations (FIGS. 1-10) are carried-out by the microprocessor 214 receiving instructions form the smartphone 5. An embodiment of the present invention is depicted with respect to the following FIG. 8, and in particular an overview of the network system and electronic circuitry and components of the HVAC control system of the present invention.

The network includes a remote device 205 such as a smartphone or table having a touch screen 208, thermostat 210 includes a display 212 (including touch sensitive area 213), a microprocessor 214 and switch 209. Switch 1 is provided, which may be opened and closed in order to signal the microprocessor 214 (e.g. to increment the selected set-point). As well a Switch 2, is provided which may be opened or closed to signal the microprocessor 214 (e.g. to decrement the selected set-point). The microprocessor controls the HVAC system 211 attached to the thermostat 210 and also is connected to the display 212, which allows for user input to adjust the system. For example, in a typical HVAC system 211, the thermostat 210 would be used to adjust the heating or cooling of the system in order to provide a comfortable environment for the occupants. The microprocessor 214 includes ROM which may have software loaded into it, in order to control the thermostat 210 and to provide for the display screen functionality. The display screen 212 includes displayable touch sensitive areas (see FIGS. 1-14). As will be discussed in greater detail below, the combination of the actuation of Switch 1 and Switch 2 (via a rocker switch) and the touch sensitive areas 213 on the display screen 212 allow the microprocessor 214 to monitor and control the air handler HVAC system or any other system to which the thermostat 10 is connected.

Figure 18:
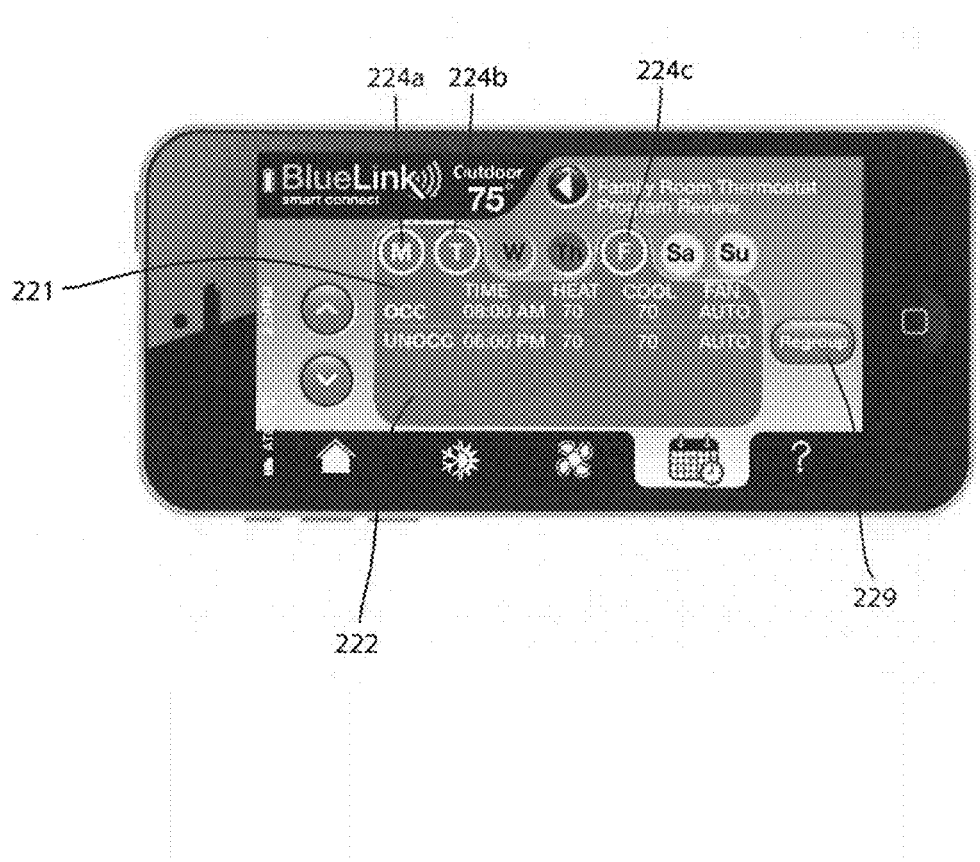

FIG. 18 depicts an alternate embodiment of the invention that provides the quick edit function for only two conditions. For example, in the case of a commercial building the grouping of M, T, F (Monday, Tuesday, Friday) will be set for only occupied ("OCC") and unoccupied conditions ("UNOCC") according to the first section 221 of the selection display to use the quick edit feature for time and temp set points for "OCC" and the set and section of the screen 222 to set time and temp for "UNOCC". It can be seen that the bubble highlight portion surrounds M, T, F to set the "OCC" and "UNOCC" conditions (e.g. in a commercial setting a building is "occupied during normal work hours from 8 am to 5 pm and "unoccupied from "5:01 pm to 7:59 am" the following day) and can be saved by the software of the thermostat or remote programming device by selecting the "Regroup" button 229.

While various concepts have been described in detail, it would be appreciated by those skilled in the art that various modifications and alternatives to those concepts could be developed in light of the overall teachings of the disclosure. Therefore, a person skilled in the art, applying ordinary skill, will be able to practice the invention set forth in the claims without undue experimentation. It will additionally be appreciated that the particular concepts exposed herein are meant to be illustrative only and not limiting to the scope of the invention, which is to be given the full breath of the appended claims and any equivalents thereof.

We claim:

1. A control for adjusting an environment control panel comprising:
   a controller including a microprocessor and memory;
   a display screen including a touch sensitive screen, the display screen coupled to the microprocessor and adapted to display a user interface programed by the microprocessor, the user interface including a programming mode interface, the programming mode interface including:
   1) a set of day of week icons indicating days of a week, two or more day of week icons within the set of day of week icons adapted to be selected to form a group;
   2) a set point table corresponding to the group and including a set of time segments, the set of time segments including more than one time segment, each time segment within the set of time segments including a set of adjustable set points, each adjustable set point within the set of adjustable set points being applicable to each day of week within the group, each time segment within the set of time segments adapted to be selected to form a selected time segment, the selected time segment displayed differently from other time segments within the set of time segments, each adjustable set point within the set of adjustable set points of the selected time segment adapted to be selected when the adjustable set point is depressed for a predetermined duration to form a selected set point, wherein all other set points of the selected segments that are not activated are indicated differently when the selected set point is activated, and wherein:
      a. the set of adjustable set points includes a time setting for configuring a starting time of the corresponding time segment;
      b. the set of adjustable set points includes a heating temperature setting; and
      c. the set of adjustable set points includes a cooling temperature setting;
   3) a single increment adjustment icon, the increment adjustment icon adapted to increase a value of the selected set point by an increment when operated on and thereby form a first updated value of the selected set point wherein the first updated value is applicable to each day of week within the group, wherein the selected set point is any one of the set of adjustable set points including the time setting, the heating temperature setting and the cooling setting of the selected time segment; and
   4) a single decrement adjustment icon, the decrement adjustment icon adapted to decrease a value of the selected set point by a decrement when operated on and thereby form a second updated value of the selected set point wherein the second updated value is applicable to each day of week within the group, wherein the selected set point is any one of the set of adjustable set points including the time setting, the heating temperature setting and the cooling setting of the selected time segment.

2. The control of claim 1 wherein the set of day of week icons includes a Monday icon, a Tuesday icon, a Wednesday icon, a Thursday icon, a Friday icon, a Saturday icon and a Sunday icon.

3. The control of claim 1 wherein each day of week icon within the group is adapted to be deselected from the group and thereby forming a different group.

4. The control of claim 1 wherein any day of week within the set of day of week icons is adapted to be regrouped into the group and thereby forming a different group.

5. The control of claim 1 wherein the set of time segments are adapted to be displayed in rows of the set point table and the set of set points of the set of time segments are adapted to be displayed in columns of the set point table.

6. The control of claim 5 wherein the set of set points further includes a fan mode setting.

7. The control of claim 6 wherein when:
   1) the selected set point is the time setting, the increment is one or more minutes and the decrement is one or more minutes;
   2) the selected set point is the heating temperature setting or the cooling temperature setting, the increment is one or more degrees and the decrement is one or more degrees; and
   3) the selected set point is the fan mode setting, the increment indicates a previous fan mode and the decrement indicates a next fan mode.

8. The control of claim 1 wherein the all other set points of the selected segments that are not activated are suppressed when the selected set point is activated.

9. The control of claim 1 wherein the set of time segments includes a morning time segment, a day time segment, an evening time segment and a night time segment.

10. A control for adjusting a thermostat comprising:
    a controller including a microprocessor and memory;
    a display screen including a touch sensitive screen, the display screen coupled to the microprocessor and adapted to display a user interface programed by the microprocessor, the user interface including a programming mode interface, the programming mode interface including:
    1) a set of day of week icons indicating seven days of a week, more than one day of week icon within the set of day of week icons adapted to be selected to form a group;
    2) a set point table corresponding to the group and including a set of time segments displayed in rows, the set of time segments including more than one time segment, each time segment within the set of time segments including a set of adjustable set points displayed in columns, the set of adjustable set points including a time setting for configuring a starting time of the corresponding time segment, a heating setting, a cooling setting and a fan mode setting, each adjustable set point within the set of adjustable set points being applicable to each day of week within the group, each time segment within the set of time segments adapted to be selected to form a selected time segment, the selected time segment displayed differently from other time segments within the set of time segments, each adjustable set point within the set of adjustable set points of the selected time segment adapted to be selected when the adjustable set point is depressed for a predetermined duration to form a selected set point, wherein all other set points of the selected segments that are not activated are indicated differently when the selected set point is activated;
    3) a single increment adjustment icon, the increment adjustment icon adapted to increase a value of the selected set point by an increment when operated on and thereby form a first updated value of the selected set point wherein the first updated value is applicable to each day of week within the group, wherein the selected set point is any one of the time setting, the heating temperature setting, the cooling setting, and the fan mode setting of the selected time segment; and 4) a single decrement adjustment icon, the decrement adjustment icon adapted to decrease a value of the selected set point by a decrement when operated on and thereby form a second updated value of the selected set point wherein the second updated value is applicable to each day of week within the group, wherein the selected set point is any one of the time setting, the heating temperature setting, the cooling setting, and the fan mode setting of the selected time segment.

11. A method for programming an environment control panel, the method operated within a controller and comprising:

1) displaying a programming mode interface on a display of the controller, said controller having a microprocessor and a memory, said display and said memory coupled to said microcontroller, said programming mode interface including:

i.) a set of day of week icons indicating days of a week;

ii.) a set point table including a set of time segments in rows, the set of time segments including more than one time segment, each time segment within the set of time segments including a set of adjustable set points;

iii.) a single increment adjustment icon, the increment adjustment icon adapted to increase a value of a set point within said set of set points when operated on; and iv.) a single decrement adjustment icon, the decrement adjustment icon adapted to decrease a value of a set point within said set of set points when operated on;

2) selecting two or more day of week icons within said set of day of week icons, thereby forming a group;

3) selecting a time segment within said set of time segments, thereby forming a selected time segment;

4) displaying said selected time segment differently from other time segments within said set of time segments;

5) selecting a set point within said set of set points of said selected time segment when said set point has been depressed for a predetermined duration;

6) suppressing other set points within said set of set points of said selected time segment when said selected set point is selected;

7) increasing a value of said selected set point when said increment adjustment icon is depressed, thereby forming a first updated value of said selected set point wherein said first updated value is applicable to each day of week within said group; and 8) decreasing a value of said selected set point when said decrement adjustment icon is depressed, thereby forming a second updated value of said selected set point wherein said second updated value is applicable to each day of week within said group.

12. The method of claim 11 further comprising removing a day of week from said group.

13. The method of claim 11 further comprising adding a day of week to said group.

14. The method of claim 11 wherein said set of day of week icons includes a Monday icon, a Tuesday icon, a Wednesday icon, a Thursday icon, a Friday icon, a Saturday icon and a Sunday icon.

15. The method of claim 11 wherein said set of set points includes at least one of a heating temperature setting, a cooling temperature setting and a fan mode setting.

* * * * *